United States Patent [19]

Matsuzaki et al.

[11] Patent Number: 5,134,531
[45] Date of Patent: Jul. 28, 1992

[54] MAGNETIC HEAD HAVING A SLIDER WITH A PARTICULAR SURFACE ARRANGEMENT

[75] Inventors: Mikio Matsuzaki; Shunichi Katase, both of Tokyo, Japan

[73] Assignee: TDK Corporation, Tokyo, Japan

[21] Appl. No.: 534,235

[22] Filed: Jun. 7, 1990

[30] Foreign Application Priority Data

Jun. 8, 1989 [JP] Japan ................. 1-145820

[51] Int. Cl.$^5$ ............... G11B 5/60; G11B 5/187
[52] U.S. Cl. .................... 360/103; 360/122
[58] Field of Search ............. 360/103, 102, 104, 122

[56] References Cited

U.S. PATENT DOCUMENTS

| | | | |
|---|---|---|---|
| 3,668,668 | 6/1972 | Robitschek | 360/103 |
| 3,837,073 | 9/1974 | Case | 360/103 |
| 3,855,625 | 12/1979 | Garnier | 360/103 |
| 3,990,106 | 11/1976 | Kameyama et al. | 360/103 |
| 4,219,853 | 8/1980 | Albert et al. | 360/103 |
| 4,321,641 | 3/1982 | Lee | 360/103 |
| 4,346,965 | 8/1983 | DeMoss | 360/103 |
| 4,399,476 | 8/1983 | King | 360/103 |
| 4,473,855 | 7/1984 | Plotto et al. | 360/103 |
| 4,489,484 | 12/1984 | Lee | 360/103 |
| 4,648,087 | 3/1987 | Scranton et al. | 360/103 |
| 4,670,804 | 6/1987 | Kant et al. | 360/102 |
| 4,670,806 | 6/1987 | Cibose | 360/103 |
| 4,721,367 | 1/1988 | Yoshinaga et al. | 350/336 |
| 4,734,805 | 3/1988 | Yamada et al. | 360/104 |
| 4,761,699 | 8/1988 | Ainslee et al. | 360/103 |
| 4,789,914 | 12/1988 | Ainslie et al. | 360/104 X |
| 4,796,127 | 1/1989 | Wada et al. | 360/103 |
| 4,803,577 | 2/1989 | Ezaki et al. | 360/102 |
| 4,809,104 | 2/1989 | Kudsen et al. | 360/103 |
| 4,819,094 | 4/1989 | Oberg | 360/104 |
| 4,856,181 | 8/1989 | Pichler et al. | 360/103 X |
| 4,870,520 | 9/1989 | Shaw | 360/103 |
| 4,908,727 | 3/1990 | Ezaki et al. | 360/135 |
| 4,910,621 | 3/1990 | Matsuda et al. | 360/103 |
| 4,918,556 | 4/1990 | Ezaki et al. | 360/103 X |
| 4,924,334 | 5/1990 | Diepers et al. | 360/103 X |
| 4,928,195 | 5/1990 | Ezaki et al. | 360/103 |
| 4,938,569 | 7/1990 | Tsunoda et al. | 350/339 F |
| 4,939,604 | 7/1990 | Fukuda et al. | 360/103 |
| 4,962,437 | 10/1990 | Wilcox | 360/103 |
| 5,001,583 | 3/1991 | Matsuzaki | 360/103 |

FOREIGN PATENT DOCUMENTS

| | | | |
|---|---|---|---|
| 0260152 | 3/1988 | European Pat. Off. | 357/8 |
| 0126521 | 1/1979 | Japan | 360/122 |
| 57-98120 | 6/1982 | Japan | 360/103 |
| 0210511 | 9/1986 | Japan | 360/122 |
| 0121116 | 5/1988 | Japan | 360/122 |
| 0084486 | 3/1989 | Japan | 360/110 |
| 2103714 | 4/1990 | Japan | 360/103 |

OTHER PUBLICATIONS

IBM Technical Disclosure Bulletin vol. 26, No. 6, Nov. 1983, Head Suspension Assemblies with Internal Preloaded Dimple, Nayak.

IBM 3370 Film Head Design and Fabrication, Feb. 1980, pp. 6-9, IBM Disk Storage Technology, by R. E. Jones, Jr.

Primary Examiner—John H. Wolff
Assistant Examiner—Craig A. Renner
Attorney, Agent, or Firm—Oblon, Spivak, McClelland, Maier & Neustadt

[57] ABSTRACT

A magnetic head includes a slider provided with at least one reading/writing element wherein the slider has a pair of rail portions projecting with a space therebetween from the surface opposing a magnetic recording medium so as to extend in the direction of air discharge. The slider surface between the pair of rail portions includes first and second grooves formed inside and along rail portions and a flat portion formed between the first and second grooves, wherein the depth $\alpha$ from the surface of one of the rail portions to the flat portion and the depth $\beta$ from the flat portion to the bottom of the first or second groove satisfy a relation of $\alpha > \beta$.

2 Claims, 3 Drawing Sheets

MAGNETIC HEAD HAVING A SLIDER WITH A PARTICULAR SURFACE ARRANGEMENT

BACKGROUND OF THE INVENTION

1. Field of the Invention

The present invention relates to a flying type magnetic head having a slider provided with at least one reading/writing element. More particularly, the present invention relates to a flying type magnetic head having a slider provided with at least one reading/writing element wherein two rail portions are formed on the surface opposing a magnetic recording medium.

2. Discussion of Background

There has been known a flying type magnetic head wherein a small flying height is produced between the magnetic head and a magnetic disk by utilizing a dynamic pressure produced due to the viscosity of air when the magnetic head is relatively moved at a high speed with respect to the magnetic disk.

FIG. 3 shows a typical construction of a conventional flying type magnetic head. In FIG. 3, reference numeral 1 designates a slider, numerals 2, 2 designate reading/writing elements, numeral 3 designates a protective film and numerals 4 designate bonding pads.

The slider 1 is provided with a pair of rail portions 102, 103 projecting with a space therebetween from an opposing surface to a magnetic disk so as to extend along the direction of air discharge a. Each surface 104 or 105 of each of the rail portions 102, 103 is used as an air bearing surface, and taper portions 104a, 105a are formed at respective ends in the air discharge direction of the surfaces 104, 105 of the rail portions.

A slider surface between the rail portions 102, 103 includes, as shown in FIG. 4, a first groove 106 and a second groove 107 which are formed inside and along the rail portions 102, 103, and a flat portion 108 formed between the first and second grooves 106, 107. The first and second grooves 106, 107 function to suppress chips which may be caused when the rail portions 102, 103 are formed by machining, and they also define the width of each of the rail portions 102, 103. In the conventional magnetic head, both grooves 106, 107 and the flat portion 108 are so formed as to have dimensions of $\alpha$ of about 100 $\mu$m and $\beta$ of about 150 $\mu$m where $\alpha$ is the depth from the surface 104 or 105 of the rail portion 102 or 103 to the flat portion 108, and $\beta$ is the depth from the flat portion 108 to the bottom surface of the first groove 106 or the second groove 107.

A third groove 109 and a fourth groove 110 are formed respectively outside the rail portions 102, 103 wherein the depths of the grooves 109, 110 are the same as those of the first and second grooves 106, 107. The third and fourth grooves 109, 110 are to suppress tipping which may occur when the rail portions 102, 103 are formed by machining, and they also define the width of the rail portions.

FIG. 5a and FIG. 5b are diagrams for explaining steps for machining the grooves.

A wafer in which a large number of magnetic heads are formed in the lateral and longitudinal directions is cut to obtain a number of laterally arranged magnetic heads in which magnetic heads A1, A2, A3 . . . are arranged in side-by-side relation as shown in FIG. 5a. Then, grooves are formed by machining in areas indicated by hatched lines for each of the magnetic heads A1, A2, A3, whereby the first through the fourth grooves 106-110 are formed so that the bottom of the grooves are respectively about 250 $\mu$m deep from the surfaces 104, 105 of the rail portions 102, 103. The widths d1-d4 of the first through the fourth grooves 106-110 are far smaller than the distance between the rail portions 102 and 103 wherein the width d1 and the width d3 are substantially equal to the width d2 and the width d4 respectively.

Then, a hatched area on the slider surface between the first and second grooves 106, 107 is shaved by machining as shown in FIG. 5b. Thus, there is obtainable a magnetic head wherein the depth $\alpha$ from the surface 104 or 105 of the rail portion 102 or 103 to the flat portion 108 is about 100 $\mu$m and the depth $\beta$ from the flat portion 108 to the bottom surface of the first groove 106 or the second groove 107 is about 150 $\mu$m. Then, by cutting the laterally arranged magnetic heads at cutting lines X—X, separate pieces of magnetic head are obtained.

Each of the reading/writing elements 2 is a thin film element prepared in accordance with the same process as an IC manufacturing technology. Generally, one or two reading/writing elements are used, and they are attached to an end surface in the direction of air discharge of the slider at or around intermediate portions between the rail portions 102, 103. The reading/writing element or elements are covered by a protective film 3 made of a material such as alumina.

A pair of the bonding pads 4 are connected to each of the reading/writing elements 2, and they are electrically connected to a conductor coil film (not shown) which constitutes Each of the reading/writing elements 2. The each of the bonding pads 4 is connected with a lead wire introduced from a magnetic disk drive (not shown).

After the cutting operations have been finished to thereby form the grooves and the separate pieces of magnetic heads, there remain swarf and sludge in the first through the fourth grooves 106-110. These swarf and sludge may damage the surface of a magnetic recording medium, or cause head crush. Accordingly, an automatic brush-washing apparatus was used to removed them.

Since one side of each of the third and fourth grooves 109, 110 opens toward the outside, the swarf and sludge can be removed by the automatic brush-washing apparatus. However, the first and second grooves 106, 107 respectively have both side portions closed by the inner side planes of the rail portions 102, 103 and the inner planes of the flat portion, and the depth $\beta$ of the grooves from the front surface of the flat portion 108 to the bottom of the grooves is as deep as about 150 $\mu$m. Accordingly, it was difficult to completely remove the swarf and sludge remaining in the grooves 106, 107, and the remaining swarf and sludge may cause a damage of the surface of a magnetic recording medium and a head crush.

The configuration of a magnetic head has been more and more miniaturized in a combination of a computer, in order to satisfy demands of the transmission of data at high speed and the magnetic-recording of the data at a high density. As the magnetic head is made small, the mass is reduced, and rapid-accessing becomes possible, whereby demands of high speed response, high density recording and increased storage capacity can be satisfied. As the magnetic head is miniaturized, the widths of the first and second grooves 106, 107 become small, and it is more and more difficult to remove the swarf and sludge.

Further, since the depths of the first and second grooves 106, 107 are large, an area to attach the bonding pads 4 can not be sufficiently provided in a small-sized magnetic head, so that selectivity in forming or attaching the bonding pads 4 is narrowed.

SUMMARY OF THE INVENTION

It is an object of the present invention to provide a magnetic head which allows the removal of swarf and sludge; provides a sufficient area for attaching or forming bonding pads and increases freedom in design.

The foregoing and other objects of the present invention have been attained by providing a magnetic head having a slider provided with at least one reading/writing element characterized in that the slider comprises a pair of rail portions projecting with a space therebetween from the surface opposing a magnetic recording medium so as to extend in the direction of air discharge, and the slider surface between the pair of rail portions includes first and second grooves formed inside and along the rail portions and a flat portion formed between the first and second grooves, wherein the depth $\alpha$ from the surface of any of the rail portions to the flat portion and the depth $\beta$ from the flat portion to the bottom of the first or second groove satisfy a relation of $\alpha >> \beta$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
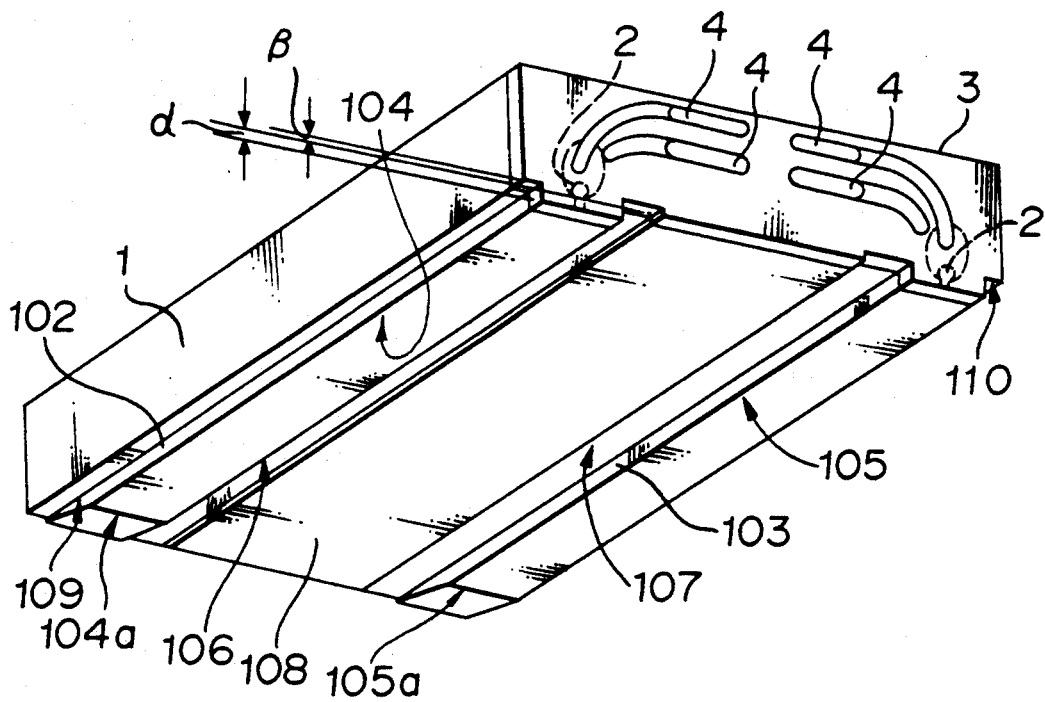
FIG. 1 is a perspective view of an embodiment of the flying type magnetic head according to the present invention.
Figure 2:
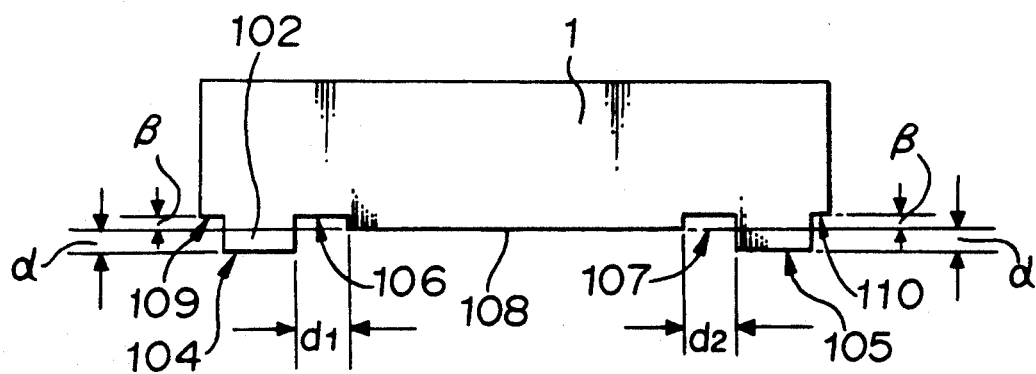
FIG. 2 is a side view of the magnetic head as in FIG. 1 viewed from the side of air discharge.

Referring to the drawings wherein the same reference numerals designate the same or corresponding parts, and more particularly to FIGS. 1 and 2 thereof, there are shown a perspective view and a side view of the magnetic head according to the present invention.

Figure 3:
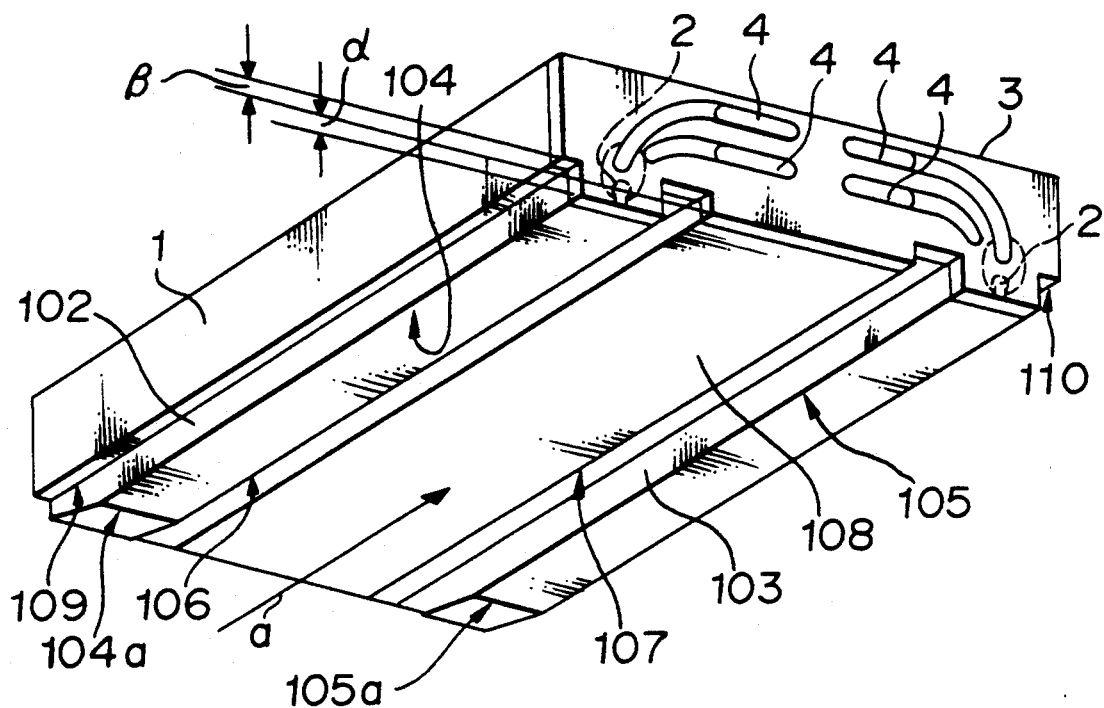
FIG. 3 is a perspective view of a conventional magnetic head.
Figure 4:
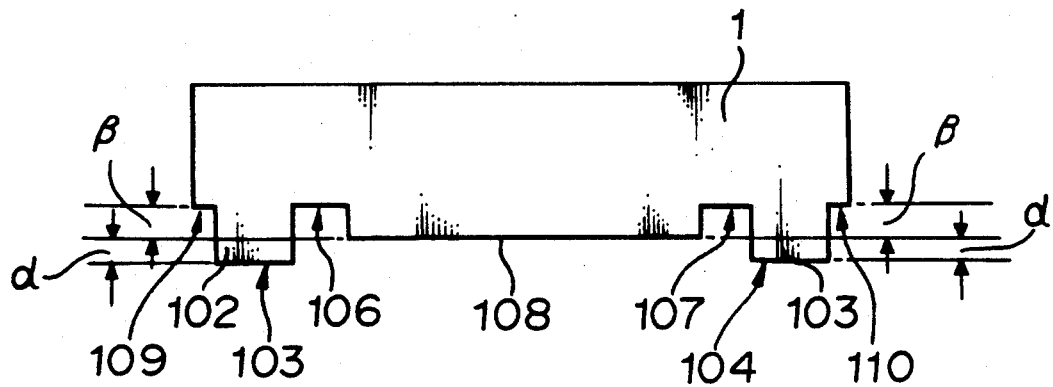
FIG. 4 is a side view of the magnetic head as in FIG. 3 viewed from the side of air discharge.
Figure 5:
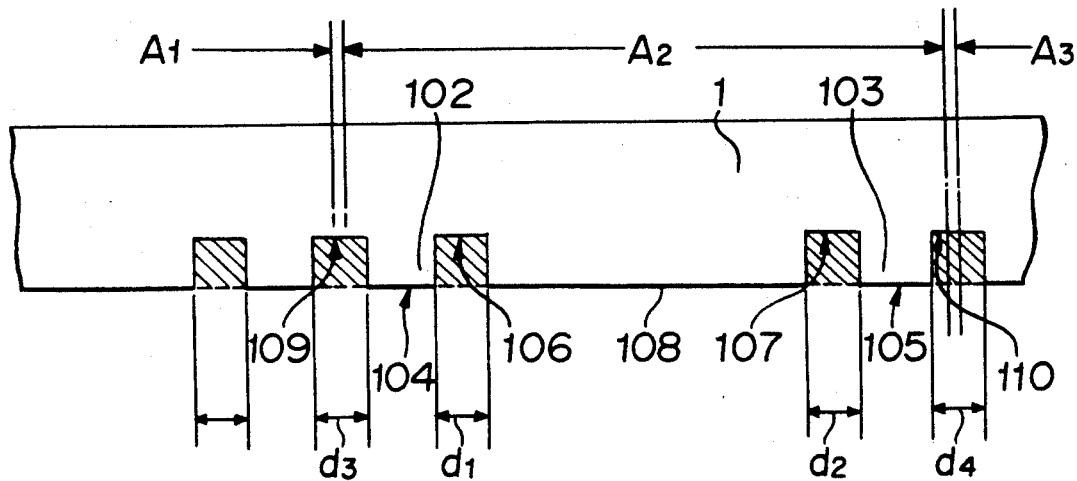
FIGS. 5a and 5b are diagrams showing steps of machining grooves in the slider of the magnetic head.
Figure 5:
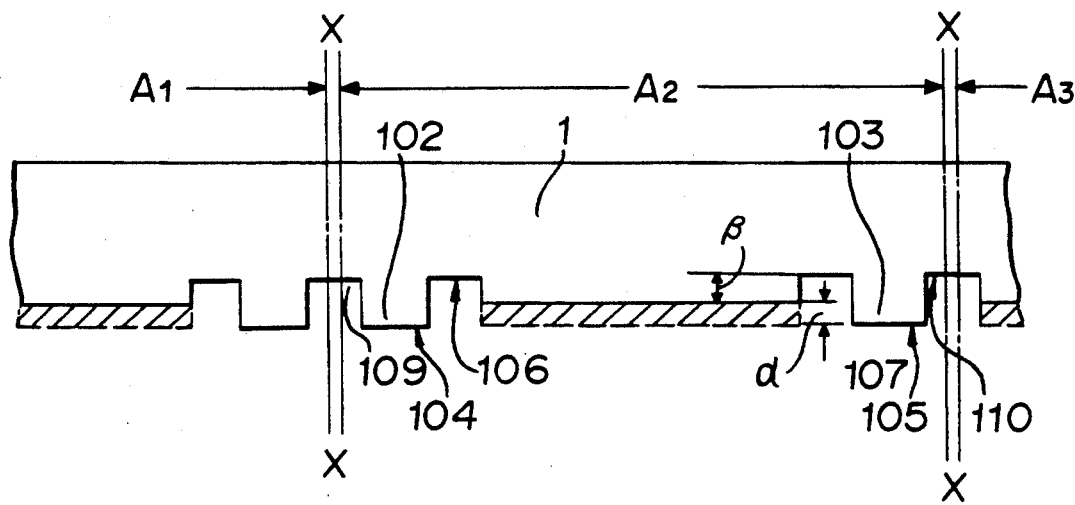

In the slider 1 of the present invention, the slider surface between the rail portions 102, 103 includes the first and second grooves 106, 107 formed inside and along the rail portions 102, 103 and the flat portion 108 formed between the first and second grooves 106, 107. The above-mentioned structure is the same as that shown in FIG. 3. However, the distinguishable feature of the present invention is that when the depth from the surface 104 or 105 of the rail portion 102 or 103 to the flat portion 108 is assumed to be $\alpha$, and the depth from the flat portion 108 to the bottom of the first groove 106 or the second groove 107 is assumed to be $\beta$, a relation of $$\alpha >> \beta$$

is satisfied. In the specific embodiment as shown in FIGS. 1 and 2, $\alpha$ and $\beta$ are so determined that $$\alpha = 100 \ \mu m \ and \ \beta = 10 \ \mu m.$$

Accordingly, the depth $\alpha$ is extremely larger than the depth $\beta$. Generally, the relation of $\alpha$ and $\beta$ is such that $\gamma = \alpha + \beta$ where $\alpha$ and $\beta$ are described above, and $\gamma$ is the depth from the surface 104 or 105 to the bottom of the first groove 106 or the second groove 107, and wherein $\alpha \approx \gamma$. It was confirmed that a stable flying characteristic could be obtained when the depth $\alpha$ is 30 $\mu m$ or more in ordinary magnetic heads.

As described above, in the present invention, the depths of the first and second groove 106, 107 can be small in comparison with those in the conventional magnetic head. Accordingly, the swarf and sludge remaining in the grooves 106, 107 can be easily and certainly removed.

By forming the depths of the first and second grooves 106, 107 so as to be small, an area for attaching or forming the bonding pads 4 can be increased and the freedom of designing magnetic heads is increased. The depths of the third and fourth grooves 109, 110 may be the same as those of the first and second grooves 106, 107.

A thin film magnetic head wherein a reading/writing element or elements 2 are formed by a thin film element or elements, has been described. However, the present invention is applicable to a composite type magnetic head.

Thus, in accordance with the present invention, swarf and sludge remaining in the grooves of a small-sized magnetic head of a high-speed response type or a high-density recording type can be easily and certainly removed to thereby eliminate a danger of a flaw on the surface of a magnetic recording medium or head crushing. Further, in accordance with the present invention, it is possible to provide an area necessary to form or attach bonding pads. Freedom in designing a magnetic head is increased, and processability in connecting lead wires to the bonding pads can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic head having a slider provided with at least one reading/writing element wherein said slider comprises;

a pair of rail portions projecting with a space therebetween from a slider surface opposing a magnetic recording medium so as to extend in a direction of air discharge, the slider surface between said pair of rail portions including first and second grooves formed inside and along said rail portions and a flat portion formed between said first and second grooves, wherein a depth $\alpha$ from a surface of one of the rail portions to said flat portion and a depth $\beta$ from said flat portion to a bottom portion of said first or second groove satisfy a relation of $\alpha >> \beta$ such that $\alpha$ is at least ten times greater than $\beta$.

2. The magnetic head according to claim 1, wherein the depth $\alpha$ is 30 $\mu m$ or more.

* * * * *